UNITED STATES PATENT OFFICE.

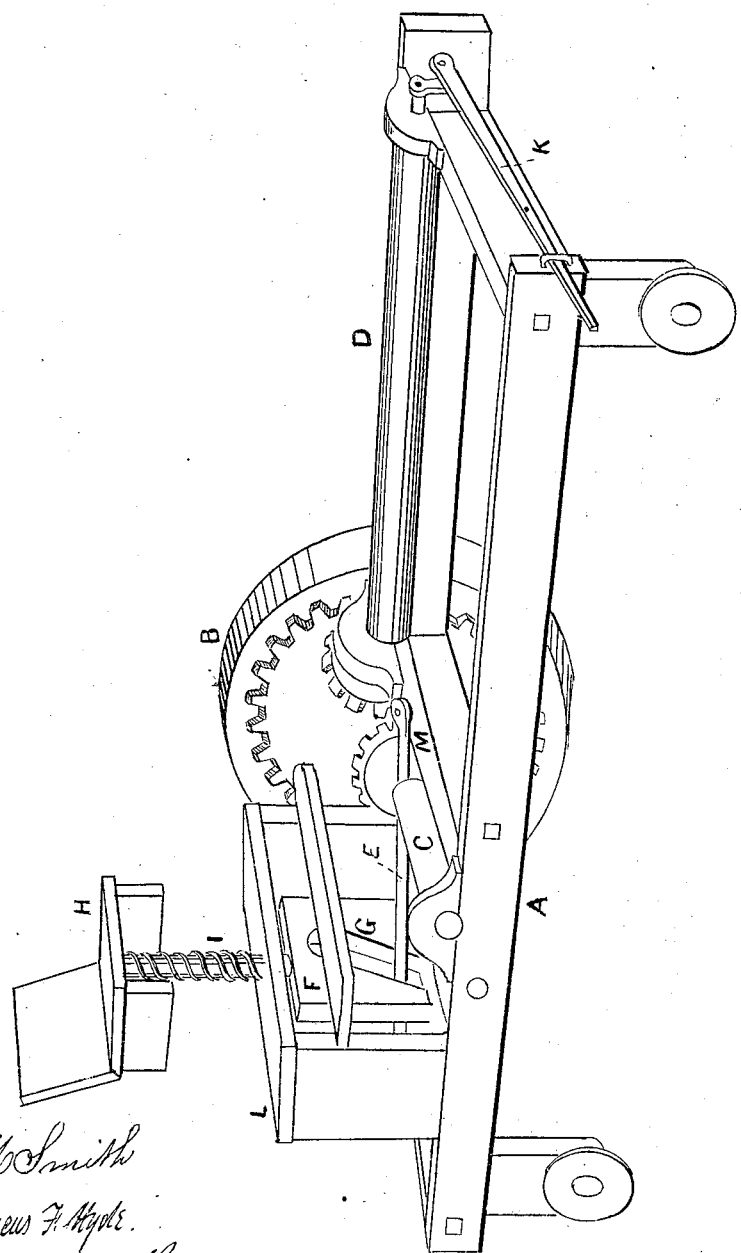

ELIZABETH M. SMITH, OF BURLINGTON, NEW JERSEY.

IMPROVEMENT IN REAPING AND MOWING MACHINES.

Specification forming part of Letters Patent No. 29,528, dated August 7, 1860.

*To all whom it may concern:*

Be it known that I, ELIZABETH M. SMITH, of Burlington, in the county of Burlington, in the State of New Jersey, have invented a new and improved mode of operating the devices for throwing in and out of gear the cutting apparatus of mowing and reaping machines; and I do hereby declare that the following is a full, clear, and exact description of the same, reference being had to the accompanying drawings, and to the letters of reference marked thereon.

The nature of my invention consists in operating the lever or other contrivance for throwing the cutters in and out of gear by means of the driver's seat, connected with said lever or other contrivance for throwing in and out of gear by any suitable device, substantially such as herein described, in such manner that when the driver takes his seat the machine is put in gear, and when he leaves his seat is thrown out of gear.

To enable others skilled in the art make and use my invention, I will proceed to describe its construction and operation.

A is the frame of reaper or mower; B, driving-wheel; C, gearing-shaft, having a lateral movement in bearings made in the frame of the machine in the usual way, with two mitered cog-wheels—one on the inner end, (not seen in the drawings,) gearing into driving-wheel B, the other gearing into mitered cog-wheel on the cutter-bar shaft D.

D is a shaft vibrating by a crank at its extremity the cutter-bar K.

E is a lever pivoted on a cross-piece, M, and working in a gutter turned in the movable gearing-shaft C.

F is a movable upright connected firmly with the seat, passing through the platform L and a slot in a [cross-piece in the frame beneath, and having a vertical movement.

G is a slot in said piece F, formed at such an angle to the perpendicular as to be equal to such lateral movement of the lever E as is required to throw the machinery in and out of gear.

H is the seat.

I is a spiral spring of such power as to elevate the seat when the driver leaves it, and to throw the machine out of gear.

The operation of said machine is as follows: When the driver takes his seat on seat H his weight forces down the piece F, and the slot G in that piece, through which the lever E passes, having its inclination toward driving-wheel B, the lever is forced in the same direction, and with it the gearing-shaft C, and the machine is thus put into gear; but when the driver leaves his seat the strong spring I raises the seat and upright, to which it is fastened, and thus forces the lever E, and the gearing-shaft with it, in the opposite direction, and thus the machine is thrown out of gear.

What I claim as my invention, and desire to secure by Letters Patent, is—

The operating the devices for putting the cutters of reaping and mowing machines in and out of gear by the agency of the driver's seat, substantially as described.

ELIZABETH M. SMITH.

Witnesses:
JOHN M. BROWN,
MARCUS F. HYDE.